US008855928B2

(12) United States Patent
Sambongi (10) Patent No.: US 8,855,928 B2
(45) Date of Patent: Oct. 7, 2014

(54) POSITIONING APPARATUS JUDGING MOVEMENT METHOD TO CONTROL POSITIONING TIMING

(75) Inventor: Masao Sambongi, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 643 days.

(21) Appl. No.: 13/224,007

(22) Filed: Sep. 1, 2011

(65) Prior Publication Data

US 2012/0059581 A1    Mar. 8, 2012

(30) Foreign Application Priority Data

Sep. 2, 2010   (JP) ................................ 2010-196306

(51) Int. Cl.
| | |
|---|---|
| G01C 21/00 | (2006.01) |
| G06F 15/00 | (2006.01) |
| G01S 19/49 | (2010.01) |
| G01S 19/34 | (2010.01) |

(52) U.S. Cl.
CPC ..... *G01S 19/49* (2013.01); *G01S 19/34* (2013.01)
USPC ........................................... 701/469; 702/150

(58) Field of Classification Search
CPC ........ G01C 21/26; G01C 21/00; G01C 21/10; G01S 19/42; G01S 19/52; G01S 19/51; G06F 15/00; H04W 4/025
USPC .................. 701/214, 469; 702/141, 142, 149, 702/150–154; 342/357.25, 357.34
See application file for complete search history.

(56) References Cited

U.S. PATENT DOCUMENTS

| | | | | |
|---|---|---|---|---|
| 5,828,987 | A | * | 10/1998 | Tano et al. ..................... 702/150 |
| 7,072,670 | B2 | * | 7/2006 | Sato et al. .................. 455/456.1 |
| 2003/0236619 | A1 | | 12/2003 | Dorian et al. |

(Continued)

FOREIGN PATENT DOCUMENTS

| | | |
|---|---|---|
| CN | 1896688 A | 1/2007 |
| EP | 2 042 832 A2 | 4/2009 |

(Continued)

OTHER PUBLICATIONS

Japanese Office Action dated Aug. 20, 2013 (and English translation thereof) in counterpart Japanese Application No. 2010-196306.

(Continued)

*Primary Examiner* — Mary Cheung
*Assistant Examiner* — Rodney Butler
(74) *Attorney, Agent, or Firm* — Holtz Holtz Goodman & Chick PC (57) ABSTRACT

A positioning apparatus includes: a first measuring section to directly measuring its own present position; a second measuring section to measure an azimuth and a movement of a user; a movement method judging section to judge a movement method of the user based on the measurement result by the second measuring section; an azimuth specifying section to specify a movement azimuth of the user based on the measurement result by the second measuring section; a movement speed calculating section to calculate an average movement speed in a period where the movement method of the user is judged to be a movement state by car; and a position calculating section to obtain a movement position by integrating a movement distance into the specified movement azimuth at the average movement speed to reference position information obtained by the first measuring section when the user is in the movement state by car.

9 Claims, 6 Drawing Sheets

(56) References Cited

U.S. PATENT DOCUMENTS

| | | |
|---|---|---|
| 2005/0225453 A1* | 10/2005 | Chang et al. .............. 340/825.69 |
| 2006/0262141 A1* | 11/2006 | Satoh et al. ................... 345/633 |
| 2007/0112540 A1 | 5/2007 | Mizuochi et al. |
| 2007/0156337 A1 | 7/2007 | Yanni |
| 2008/0100499 A1* | 5/2008 | Nishimura ...................... 342/75 |
| 2009/0082966 A1 | 3/2009 | Sato |
| 2009/0267592 A1 | 10/2009 | Judd |
| 2010/0125414 A1 | 5/2010 | Okuyama et al. |
| 2010/0159947 A1 | 6/2010 | Imafuku |
| 2010/0179757 A1 | 7/2010 | Iketani et al. |

FOREIGN PATENT DOCUMENTS

| | | |
|---|---|---|
| JP | 2000-193483 A | 7/2000 |
| JP | 2000-235068 A | 8/2000 |
| JP | 2002-048589 A | 2/2002 |
| JP | 2002-081958 A | 3/2002 |
| JP | 2005-274506 A | 10/2005 |
| JP | 2007-024620 A | 2/2007 |
| JP | 2010-122034 A | 6/2010 |
| JP | 2010-139321 A | 6/2010 |

OTHER PUBLICATIONS

Japanese Office Action dated Jan. 22, 2013 (and English translation thereof) in counterpart Japanese Application No. 2010-196306.

Chinese Office Action dated Dec. 21, 2012 (and English translation thereof) in counterpart Chinese Application No. 201110258373.5.

Extended European Search Report (EESR) dated Jan. 2, 2012 (in English) in counterpart European Application No. 11179858.3.

* cited by examiner

POSITIONING APPARATUS JUDGING MOVEMENT METHOD TO CONTROL POSITIONING TIMING

BACKGROUND OF THE INVENTION

1. Field of the Invention

The present invention relates to a positioning apparatus judging moving method to control positioning timing, a positioning method therefor, and a storage medium.

2. Description of Related Art

There has been a positioning apparatus using a function of positioning an absolute position by using a satellite positioning system, such as a GPS (global positioning system), in conjunction with a function of calculating a position by means of autonomous navigation using a motion sensor equipped with, for example, an acceleration sensor and an azimuth sensor.

By using these functions together, the frequency of receiving electric waves from positioning satellites can be reduced to curtail power consumption.

As the motion sensors for the autonomous navigation function, for example, an acceleration sensor, an angular velocity sensor, an atmospheric pressure sensor, and a magnetic sensor are used.

By extracting the features of the output patterns of these sensors, the positioning apparatus can judge the movement state of a user wearing the positioning apparatus.

For example, Japanese Patent Application Laid-Open Publication No. 2002-48589 discloses the technique of differentiating the means of migration of a mobile object by using the differences of the waveforms of an acceleration sensor and the existence of a vertical direction speed by an atmospheric pressure sensor.

SUMMARY OF THE INVENTION

It is an object of the present invention to provide a positioning apparatus capable of improving the obtainment accuracy of the locus of a migration path including a movement by car and capable of suppressing the power consumption quantity thereof, a positioning method therefor, and a storage medium.

In order to achieve at least one of the above objects, according to an aspect of the present invention, there is provided a positioning apparatus, including: a first measuring section to obtain measured position data by directly measuring its own present position; a second measuring section to measure an azimuth and a movement of a user; a movement method judging section to judge a movement method of the user based on the movement of the user measured by the second measuring section; an azimuth specifying section to specify a movement azimuth of the user based on the azimuth and the movement of the user measured by the second measuring section; a movement speed calculating section to calculate an average movement speed in a period in which the movement method judging section judges the movement method of the user to be a movement state by car by; and a position calculating section to obtain a movement position by integrating a movement distance into the movement azimuth specified by the azimuth specifying section at the average movement speed to reference position information obtained by the first measuring section when the movement method judging section judges the movement method of the user to be the movement state by car.

According to another aspect of the present invention, there is provided a positioning method of obtaining a migration path by using a first measuring section to obtain measured position data by directly measuring its own present position and a second measuring section to measure an azimuth and a movement of a user, the method comprising the steps of: judging a movement method of the user based on the movement of the user measured by the second measuring section; specifying a movement azimuth of the user based on the azimuth and the movement of the user, both measured by the second measuring section; calculating an average movement speed in a period in which the movement method of the user is judged to be a movement state by car at the step of judging; and obtaining a movement position by integrating a movement distance to reference position information obtained by first measuring section, the movement distance being a distance of a movement into the movement azimuth specified by the step of specifying at the average movement speed when the movement method of the user is judged to be the movement state by car at the step of judging.

According to another aspect of the present invention, there is provided a storage medium recording a program for a computer to be used for a positioning apparatus including a first measuring section to obtain measured position data by directly measuring its own present position and a second measuring section to measure an azimuth and a movement of a user, the program making the computer function as: a movement method judging section to judge a movement method of the user based on the movement of the user measured by the second measuring section; an azimuth specifying section to specify a movement azimuth of the user based on the azimuth and the movement of the user measured by the second measuring section; a movement speed calculating section to calculate an average movement speed in a period in which the movement method judging section judges the movement method of the user to be a movement state by car; and a position calculating section to obtain a movement position by integrating a movement distance into the movement azimuth specified by the azimuth specifying section at the average movement speed to reference position information obtained by the first measuring section when the movement method judging section judges the movement method of the user to be the movement state by car.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

In the following, an embodiment of the present invention will be described with reference to the accompanying drawings.

Figure 1:
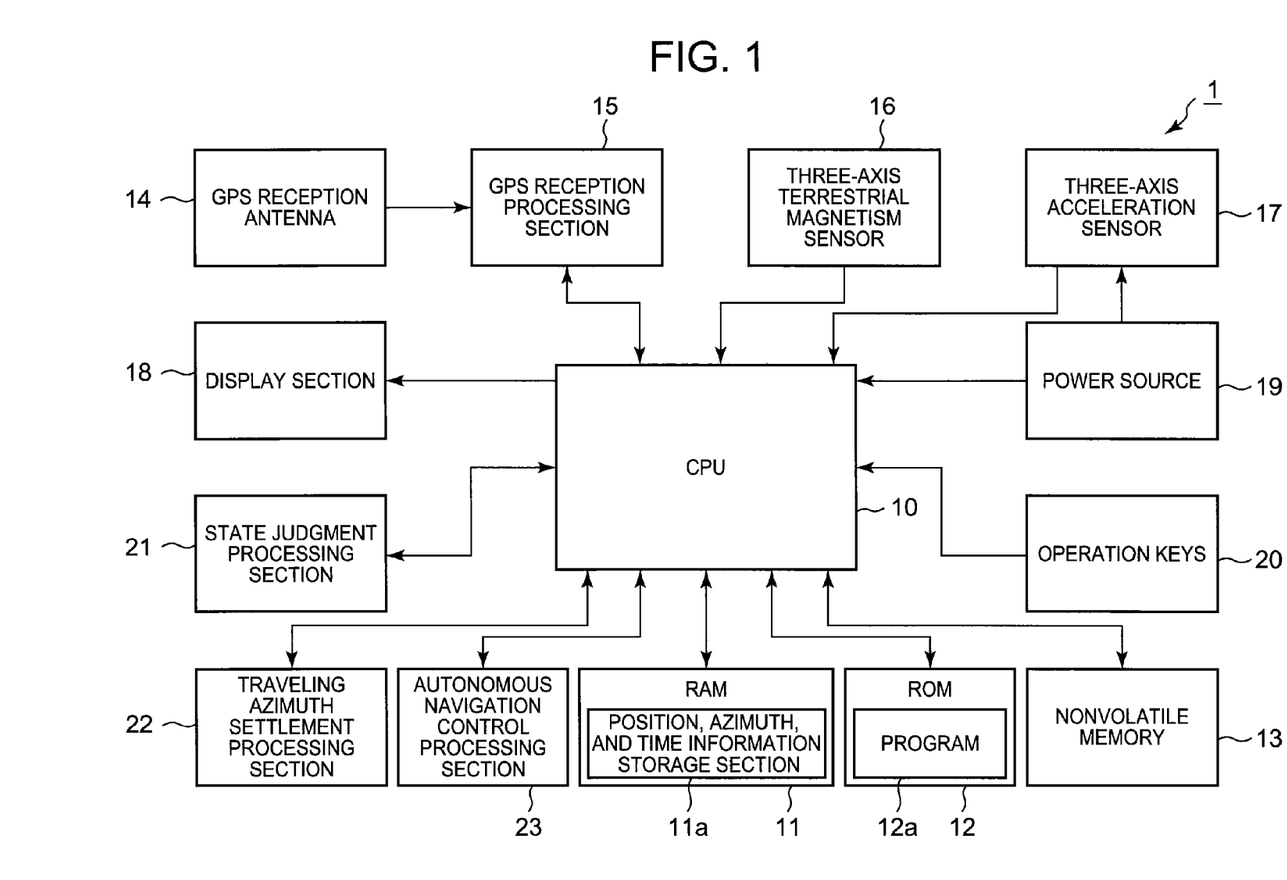
FIG. 1 is a block diagram showing the positioning apparatus of an embodiment of the present invention.

FIG. 1 is a block diagram showing the internal configuration of a positioning apparatus.

The positioning apparatus 1 is a portable positioning apparatus that a user uses by wearing it.

The positioning apparatus 1 includes a CPU (central processing unit) 10 (movement speed calculating section, position calculating section, movement data storage controlling section, positioning controlling section, migration path determining section, and display controlling section) to perform the integrated control and the arithmetic processing of the whole apparatus, a RAM (random access memory) 11 to provide a working memory space to the CPU 10, a ROM (read only memory) 12 to store programs to be executed by the CPU 10 and initial data, a nonvolatile memory 13, a GPS reception antenna to 14 receive an electric wave transmitted from a GPS satellite, a GPS reception processing section 15 as a position measuring section (first measuring section) to demodulate a received electric wave to perform the decoding processing of the demodulated electric wave, a three-axis terrestrial magnetism sensor 16 to measure terrestrial magnetism in three axis directions, a three-axis acceleration sensor 17 to measure acceleration in three axis directions, a display section 18 (display section) to perform an output display based on an output control signal from the CPU 10, a power source 19 to supply electric power to the CPU 10 and the three-axis acceleration sensor 17, operation keys 20 to convert a user's operational content into a signal to input a converted signal into the CPU 10, a state judgment processing section 21 as a movement method judging section to judge a user's movement method, a traveling azimuth settlement processing section 22 (azimuth specifying section) to specify a user's movement azimuth, an autonomous navigation control processing section 23 to calculate a user's displacement quantity, and the like.

The RAM 11 includes a position, azimuth, and time information storage section 11a (movement azimuth storage section).

The position, azimuth, and time information storage section 11a temporarily stores a position measured by the GPS (GPS positioning position), time information, a traveling azimuth of a car measured during a movement by car, and the information of the time when the car started to move on into the traveling azimuth.

The ROM 12 stores a program 12a that the CPU 10 will read out to execute.

The program 12a is, for example, a control program of the positioning apparatus 1 or a positioning processing program.

The program 12a can also be stored in the nonvolatile memory 13.

Alternatively, the program 12a may also be recorded in a portable recording medium, such as a CD-ROM (compact disk read only memory) or a flash memory, as an execution program 12a to be capable of being executed by the CPU 10 through a reading apparatus.

Moreover, it is also possible to apply a form of being downloaded to the positioning apparatus 1 through a communication line using a carrier wave as a medium for the program 12a.

The nonvolatile memory 13 is, for example, an EEPROM (electrically erasable and programmable read only memory).

The nonvolatile memory 13 can store a calculated path data.

Moreover, the nonvolatile memory 13 stores map data to use the map data to be used for the display thereof in the display section 18.

The GPS reception processing section 15 demodulates electric waves received through the GPS reception antenna 14 from a plurality of GPS satellites.

Then, the GPS reception processing section 15 obtains the present position based on the demodulated signals from the plurality of GPS satellites and outputs the result to the CPU 10 in accordance with a predetermined format.

The GPS reception processing section 15 intermittently operates based on instructions from the CPU 10.

The three-axis terrestrial magnetism sensor 16 is a sensor capable of measuring magnetic fields in three axis directions by using, for example, a magnetoresistive element.

Terrestrial magnetism is measured by the three-axis terrestrial magnetism sensor 16 and is output to the CPU 10.

The three-axis acceleration sensor 17 is a sensor capable of measuring acceleration in three axis directions.

When a user is in the state of being at a standstill, the three-axis acceleration sensor 17 measures the gravitational acceleration of the earth to output the measured data to the CPU 10.

The three-axis terrestrial magnetism sensor 16 and the three-axis acceleration sensor 17 constitute a measuring section (second measuring section).

Incidentally, in addition to this, it is also possible to enable the detection of a height change by adding, for example, an atmospheric pressure sensor to the configuration.

The display section 18 is, for example, an LCD (liquid crystal display).

Alternatively, the positioning apparatus 1 may be equipped with a display section of other display systems, such as an organic ELD (electro-luminescent display).

The display section 18 can display the information of, for example, a measured position and a migration path to be superposed on map data read out from the nonvolatile memory 13 based on a signal from the CPU 10.

The state judgment processing section 21 obtains the measured data by the three-axis terrestrial magnetism sensor 16 and the three-axis acceleration sensor 17 through the CPU 10, and judges a movement method based on the operation state of a user wearing the positioning apparatus 1 based on arithmetic results using these pieces of measured data.

The movement methods capable of being judged by the state judgment processing section 21 of the present embodiment include a stopping state, a walking state, and a movement state using a car, of a user.

Furthermore, it may be enabled to judge the movement state by means of a bicycle or the like, and the movement method by means of an escalator, a moving sidewalk, or the like, or it may be enabled to differentiate between a walking state and a running state.

The differentiation between a walking state and a movement method by car can be performed as follows based on the measurement of a user's operation with the three-axis terrestrial magnetism sensor 16 and the three-axis acceleration sensor 17.

First, in case of a walking state, the state judgment processing section 21 can determine respective movements in the vertical direction and the travelling direction from a fixed gravitational acceleration and the direction of the terrestrial magnetism obtained from the inputs of both the sensors 16 and 17.

Because the gravity center of a user wearing the positioning apparatus 1 moves in the vertical direction every step during walking and vibrates in a lateral direction at the double period of that of the vertical movement of the gravity center, the periodic changes of the vertical direction acceleration and the acceleration in the direction perpendicular to the movement direction can be measured.

In the case of a movement by car, the output of the three-axis acceleration sensor 17 first shows an increase into the traveling direction owing to the acceleration at the time of a movement start.

Moreover, in the case of the movement by car, characteristic vibrations of 1-3 Hz in the direction (lateral direction) perpendicular to the traveling direction in a horizontal plane are observed.

The movement by car can accordingly be identified by extracting a component in the lateral direction from the output of the three-axis acceleration sensor 17 and performing the Fourier transformation of the component to obtain the amplitude intensity of this frequency band, and by comparing the amplitude intensity with a predetermined threshold value.

When a user wearing the positioning apparatus 1 is moving by car, the traveling azimuth settlement processing section 22 receives the measured data by the three-axis terrestrial magnetism sensor 16 and the three-axis acceleration sensor 17 through the CPU 10 to detect the traveling azimuth of the car.

The autonomous navigation control processing section 23 receives the measured data of the three-axis terrestrial magnetism sensor 16 and the three-axis acceleration sensor 17 through the CPU 10, and calculates the movement azimuth and the movement distance of a user when the user wearing the positioning apparatus 1 is moving by a method other than a car.

Then, if the autonomous navigation control processing section 23 holds the reference position data of the starting point and the end point of this movement period, the autonomous navigation control processing section 23 obtains a position (autonomous navigation position) of the migration path by performing the addition and the subtraction of the data of the movement azimuth and the movement distance to the reference position data.

Next, an operation procedure of the positioning processing of the present invention will be described with reference to the accompanying flow charts.

Figure 2:
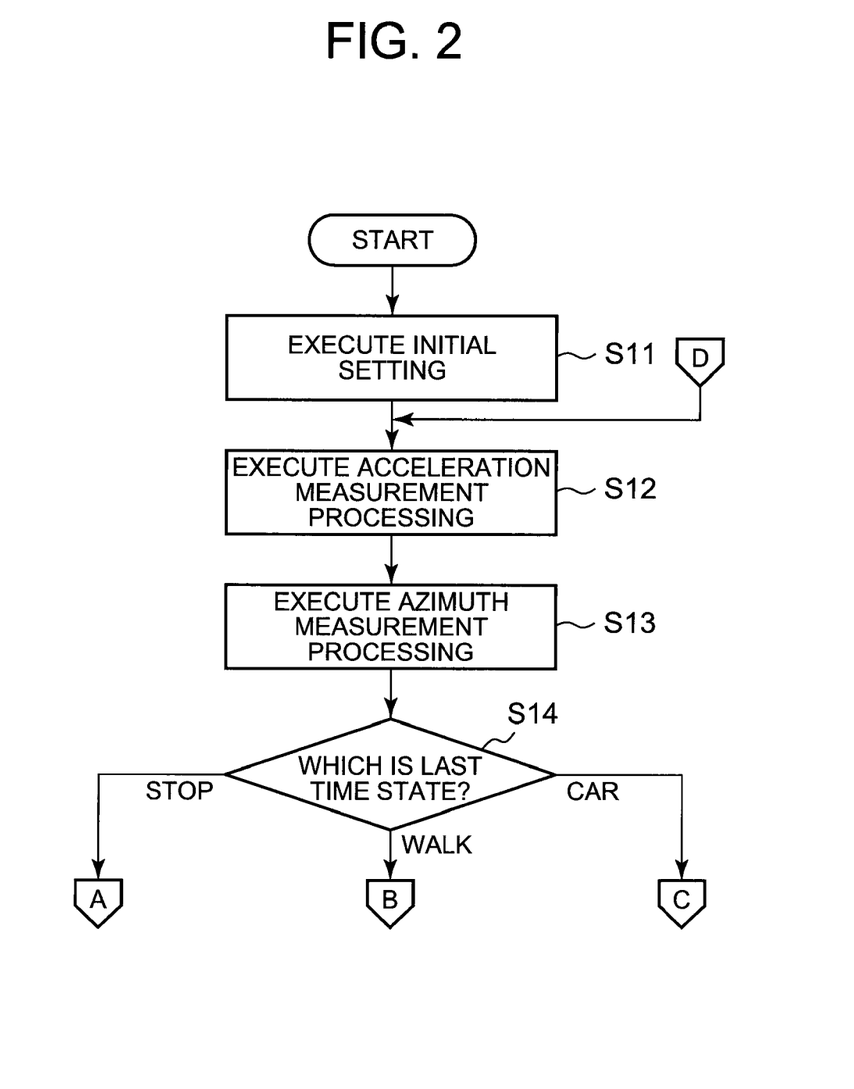
FIG. 2 is a first portion of a flow chart of positioning processing.

FIG. 2 is a flow chart showing the control procedure of the positioning processing executed by the CPU 10.

Figure 3:
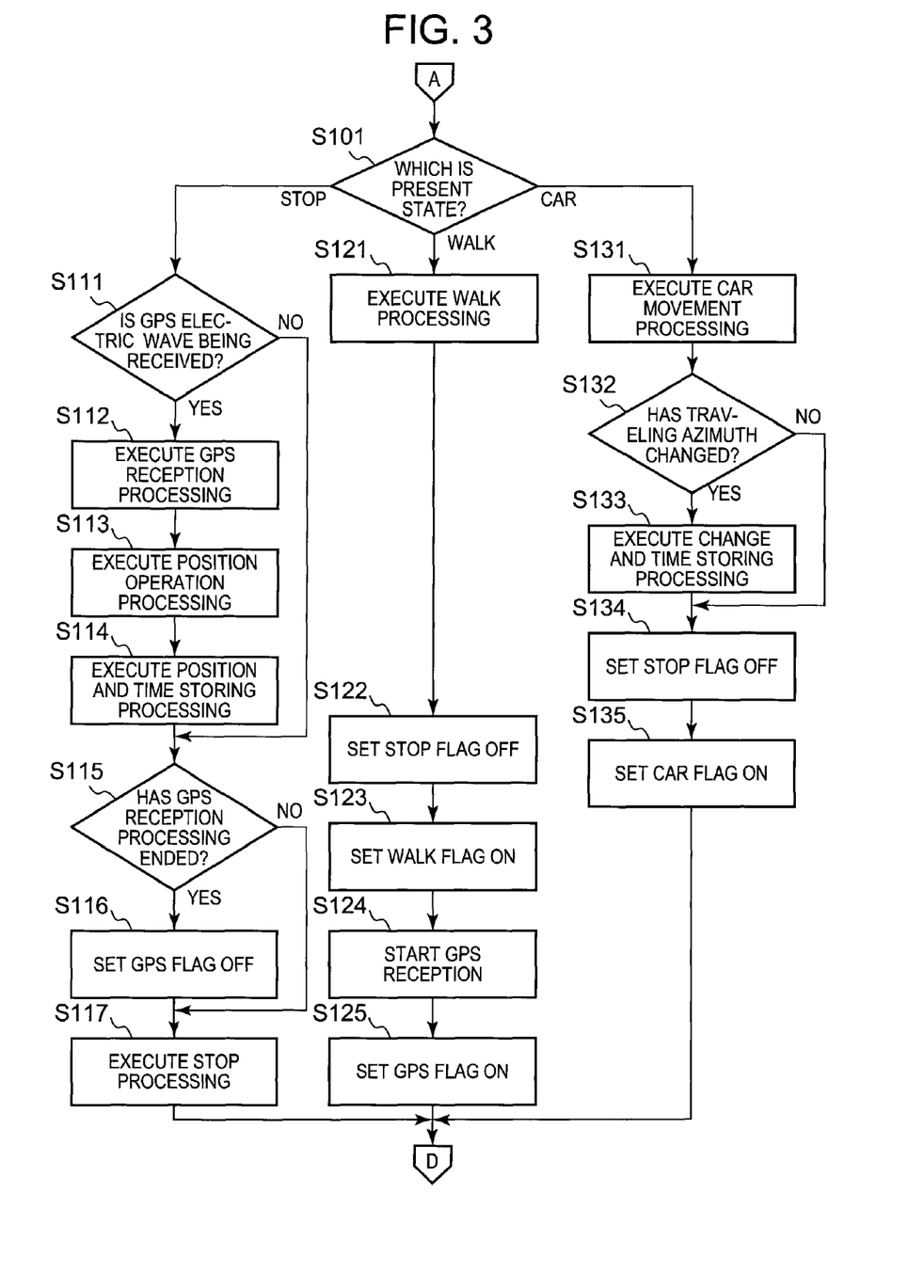
FIG. 3 is a second portion of the flow chart of the positioning processing.
Figure 4:
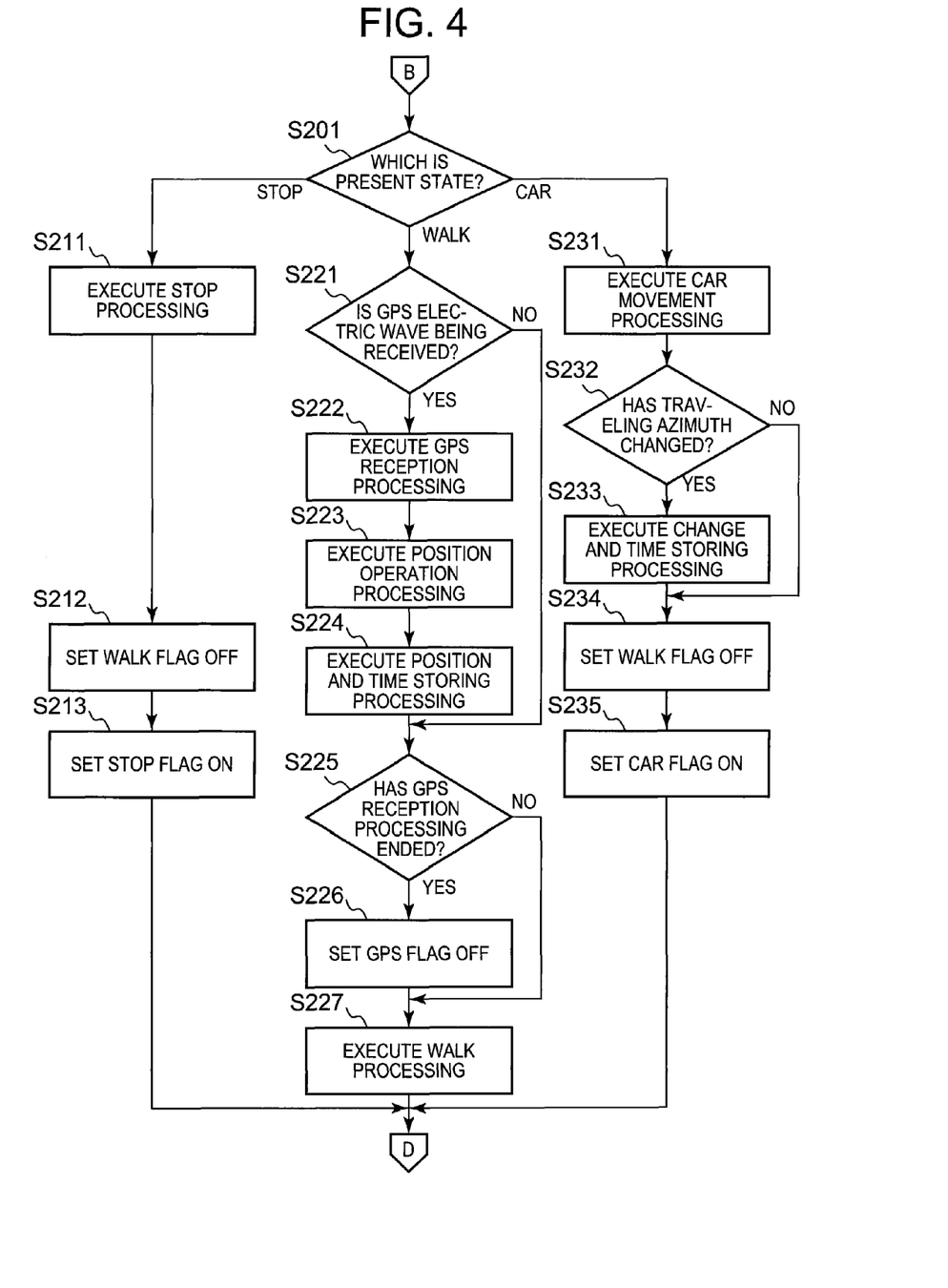
FIG. 4 is a third portion of the flow chart of the positioning processing.
Figure 5:
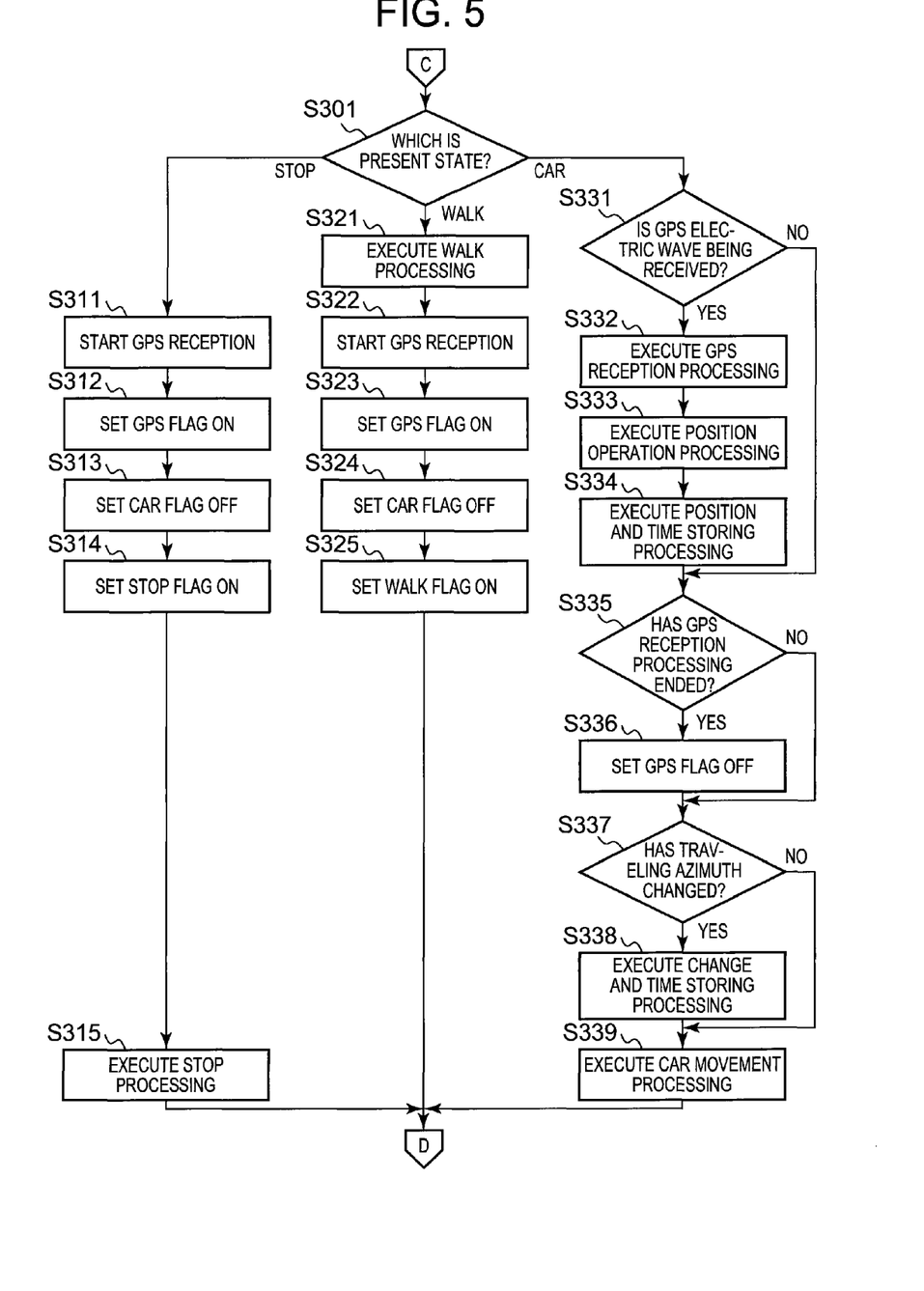
FIG. 5 is a fourth portion of the flow chart of the positioning processing.

Moreover, FIGS. 3-5 are flow charts showing the control procedures of processing after a stop, processing after a walk, and processing after a movement by car, respectively, each of which will be called in the flow chart of FIG. 2.

The control processing of the positioning processing is started based on an input signal from the operation keys 20.

When the control processing is started, the CPU 10 first performs initial setting as shown in FIG. 2 (Step S11).

Concretely, the CPU 10 makes the GPS reception processing section 15 operate to directly obtain the data of its own present position.

Moreover, the CPU 10 obtains a judgment result of the movement method of a user from the state judgment processing section 21.

When it is judged that the user is in a stopping state, the CPU 10 sets a stop flag "ON".

When it is judged that the user is in a walking state, the CPU 10 sets a walk flag "ON".

Moreover, when it is judged that the user is in a movement state by car, the CPU 10 sets a car flag "ON".

Next, the CPU 10 transmits the acceleration data in a predetermined period among the pieces of measured data input from the three-axis acceleration sensor 17 to the state judgment processing section 21 (Step S12).

Moreover, the CPU 10 transmits the terrestrial magnetism data in the predetermined period among the pieces of measured data input from the three-axis terrestrial magnetism sensor 16 to the state judgment processing section 21 (Step S13).

The CPU 10 performs judgment processing based on a user's operation state obtained from the state judgment processing section 21 at the last time (at the initial setting (Step 11) at the first time) (Step S14).

The CPU 10 performs the judgment processing by ascertaining which of the stop flag, the walk flag, and the car flag is "ON".

When it is judged that the movement method at the last time is the stopping state, the CPU 10 moves the present processing to that at Step S101.

When it is judged that the movement method at the last time is the walking state, the CPU 10 moves the present processing to that at Step S201.

Moreover, when it is judged that the movement method at the last time is the movement state by car, the CPU 10 moves the present processing to that at Step S301.

When the present processing has moved to that at Step S101, the CPU 10 transmits a signal to the state judgment processing section 21 to make the state judgment processing section 21 judge the present movement method based on the user's operation state indicated by the acceleration data and the terrestrial magnetism data transmitted to the state judgment processing section 21 at Steps S11 and S12, as shown in FIG. 3.

Then, the CPU 10 obtains the judgment result of the movement method from the state judgment processing section 21 and performs the judgment processing of the obtained movement method.

When it is judged that the present movement method is the stopping state continuously from the last time in the judgment processing at Step S101, the CPU 10 judges whether the GPS reception processing section 15 is performing reception processing of an electric wave from a GPS satellite (Step S111).

The existence of the reception processing by the GPS reception processing section 15 is indicated by whether a GPS flag is "ON" or "OFF".

When it is judged that the GPS reception processing section 15 is performing the reception processing of an electric wave from a GPS satellite, the CPU 10 makes the GPS reception processing section 15 continuously perform the GPS reception processing (Step S112).

Moreover, the CPU 10 makes the GPS reception processing section 15 perform position arithmetic processing by using the received and demodulated signal from the GPS satellite (Step S113).

The CPU 10 obtains a position arithmetic result output from the GPS reception processing section 15, and makes the position, azimuth, and time information storage section 11*a* store the obtained position and the obtained time (Step S114).

Then, the CPU 10 moves the present processing to that at Step S115.

On the other hand, when it is judged that the GPS reception processing section 15 is not performing the reception processing of any electric waves from any GPS satellites in the judgment processing at Step S111, the CPU 10 branches the present processing to the "NO" branch, and omits the processing at Steps S112-S114 to move the present processing to that at Step S115.

Next, the CPU 10 judges whether the GPS reception processing has ended or not.

When it is judged that the reception processing by the GPS reception processing section 15 is not being performed and that the GPS reception processing has already ended, the CPU 10 sets the GPS flag "OFF" (Step S116).

After that, the CPU 10 moves the present processing to that at Step S117.

When it is judged that the GPS reception processing has not ended, for example, in the case where the reception processing is repeatedly being executed in the situation in which a necessary number of satellite electric waves is not received, the CPU 10 moves the present processing to that at Step 117 with the GPS flag being "ON" as it is.

The CPU 10 executes stop processing (Step S117).

In the stop processing, the CPU 10 makes the processing in the traveling azimuth settlement processing section 22 and the autonomous navigation control processing section 23 keep in a stopping state.

After that, the CPU 10 returns the present processing to that at Step S12.

When it is judged that the present operation state is a walking state in the judgment processing at Step S101, the CPU 10 first executes walk processing (Step S121).

In this walk processing, the CPU 10 makes the autonomous navigation control processing section 23 operate to obtain the present position data measured by the autonomous navigation.

Then, the CPU 10 makes the position, azimuth, and time information storage section 11*a* store the present position data, and transmits a signal to the display section 18 to make the display section 18 display the present position on the display screen thereof.

After that, the CPU 10 sets the stop flag "OFF" (Step S122), and sets the walk flag "ON" (Step S123).

After that, the CPU 10 executes GPS reception start processing (Step S124), and sets the GPS flag "ON" (Step S125).

Then, the CPU 10 returns the present processing to that at Step S12.

When it is judged that the present movement method is a movement state by car in the judgment processing at Step S101, the CPU 10 first executes movement processing by car (Step S131).

In this movement processing by car, the CPU 10 sets the measurement results of the three-axis terrestrial magnetism sensor 16 and the three-axis acceleration sensor 17 to be input into the traveling azimuth settlement processing section 22.

After that, the CPU 10 starts the counting of the elapsed time from the time point of starting the movement by car.

Moreover, if the data of the place of starting the movement by car is not stored, the CPU 10 executes the GPS reception start processing, and sets the GPS flag "ON."

Next, the CPU 10 judges whether the traveling azimuth of the positioning apparatus 1 has changed or not (Step S132).

The traveling azimuth does not exist in a stopping state. When the user starts a movement by car, any azimuth is specified. The CPU accordingly branches the present processing to the "YES" branch.

The CPU 10 makes the position, azimuth, and time information storage section 11*a* store this specified traveling azimuth and the elapsed time from the timing when the movement by car has started (Step S133).

Then the CPU 10 moves the present processing to that at Step S134. When it is judged that the traveling azimuth has not changed, the CPU 10 branches the present processing to the "NO" branch and moves the present processing to that at Step S134 as it is.

When CPU 10 has moved the present processing to that at Step S134, the CPU 10 sets the stop flag "OFF" and sets the car flag "ON" (Step S135).

After that, the CPU 10 returns the present processing to that at Step S12.

When it is judged that the last time movement method is a walking state in the judgment processing at Step S14 (that is, the walk flag is "ON"), the CPU 10 moves the present processing to that at Step S201.

Then, as shown in FIG. 4, the CPU 10 obtains a user's present movement method from the state judgment processing section 21.

Then, the CPU 10 performs the judgment processing of this movement method.

When it is judged that the present movement method is a stopping state in the judgment processing at Step S201, the CPU 10 performs the stop processing (Step S211), and stops the processing of the autonomous navigation control processing section 23 which processing has been being made to be executed in the period of the walking state.

Then, the CPU 10 sets the walk flag "OFF" (Step S212) and sets the stop flag "ON" (Step S213).

After that, the CPU 10 returns the present processing to that at Step S12.

When it is judged that the present movement method is continuously being the walking state in the judgment processing at Step S201, the CPU 10 moves the present processing to that at Step S221.

Then, the CPU 10 judges whether the GPS reception processing section 15 is performing the reception processing of an electric wave from a GPS satellite or not.

When it is judged that the GPS reception processing section 15 is performing the reception processing of an electric wave from a GPS satellite, the CPU 10 makes the GPS reception processing section 15 continuously perform the GPS reception processing (Step S222), and uses the received and demodulated signal from the GPS satellite to make the GPS reception processing section 15 perform the position arithmetic processing (Step S223).

The CPU 10 obtains a position arithmetic result output from the GPS reception processing section 15 to make the position, azimuth, and time information storage section 11*a* store the position and the time (Step S224).

After that, the CPU 10 moves the present processing to that at Step S225.

On the other hand, when it is judged that the GPS reception processing section 15 is not performing any reception processing of any electric waves from any GPS satellites in the judgment processing at Step S221, the CPU 10 branches the present processing to the "NO" branch and omits the processing at Steps S222-S224 to move the present processing to that at Step S225.

Next, the CPU 10 judges whether the GPS reception processing has ended or not (Step S225).

When it is judged that no reception processing by the GPS reception processing section 15 is being performed and the GPS reception processing has already ended, the CPU 10 sets the GPS flag "OFF" (Step S226).

After that, the CPU 10 executes the walk processing (Step S227).

When it is judged that the GPS reception processing has not ended, the CPU 10 omits the processing at Step S226 to execute the walk processing with the GPS flag being "ON" as it is (Step S227).

In the walk processing at Step S227, the CPU 10 makes the autonomous navigation control processing section 23 continuously perform autonomous navigation, and makes the GPS reception processing section 15 operate at predetermined time intervals to obtain and update the position data to be the references of the autonomous navigation.

Moreover, the CPU 10 makes the display section 18 display the obtained data of the positions and the migration paths.

After that, the CPU 10 returns the present processing to that at Step S12.

When it is judged that the present state is a movement state by car in the judgment processing at Step S201, the CPU 10 first executes the movement processing by car (Step S231).

In this movement processing by car, the CPU 10 sets the measurement results of the three-axis terrestrial magnetism sensor 16 and the three-axis acceleration sensor 17, which measurement results have been being output to the autonomous navigation control processing section 23, to be output to the traveling azimuth settlement processing section 22.

After that, the CPU 10 starts the counting of the elapsed time from the time point of starting the movement by car.

Moreover, if the GPS positioning data of the place of starting the movement by car is not stored, the CPU 10 executes the GPS reception start processing, and sets the GPS flag "ON".

Next, the CPU 10 judges whether the traveling azimuth of the positioning apparatus 1 has changed or not (Step S232).

The traveling azimuth ordinarily changes from the azimuth at the time when the user walks to get into a car to the azimuth at the time when the user starts a movement by car, and the CPU 10 branches the present processing to the "YES" branch.

Then, the CPU 10 makes the position, azimuth, and time information storage section 11*a* store this specified traveling azimuth and the present time (Step S233).

After that, the CPU 10 moves the present processing to that at Step S234.

When it is judged that the traveling azimuth has not changed, the CPU 10 branches the present processing to the "NO" branch and moves the present processing to that at Step S234 as it is.

When the CPU 10 has moved the present processing to that at Step S234, the CPU 10 sets the walk flag "OFF" and subsequently sets the car flag "ON" (Step S235).

After that, the CPU 10 returns the present processing to that at Step S12.

When it is judge that the last time movement method is a movement state by car (that is, the car flag is "ON") in the judgment processing at Step S14, the CPU 10 moves the present processing to that at Step S301.

Then, the CPU 10, as shown in FIG. 5, transmits a signal to the state judgment processing section 21 to obtain the present movement method of the user from the state judgment processing section 21, and performs the judgment processing of this movement method.

When it is judged that the present movement method is a stopping state in the judgment processing at Step S301, the CPU 10 transmits an instruction to the GPS reception processing section 15 to make the GPS reception processing section 15 start the reception processing of the electric waves from the GPS satellites (Step S311) and sets the GPS flag "ON" (Step S312).

Moreover, the CPU 10 sets the car flag "OFF" (Step S313) and sets the stop flag "ON" (Step S314).

After that, the CPU 10 performs the stop processing (Step S315).

In this stop processing, the CPU 10 makes the processing of the traveling azimuth settlement processing section 22 stop, and stops the counting of the elapsed time from the time point of the starting of the movement by car.

Then, the CPU 10 returns the present processing to that at Step S12.

When it is judged that the present movement method is a walking state in the judgment processing at Step S301, the CPU 10 first performs the walk processing (Step S321).

In this walk processing, the CPU 10 changes the output destination of the measured data by the three-axis terrestrial magnetism sensor 16 and the three-axis acceleration sensor 17 from the traveling azimuth settlement processing section 22 to the autonomous navigation control processing section 23, and makes the processing of the traveling azimuth settlement processing section 22 stop and makes the processing of the autonomous navigation control processing section 23 start.

Next, the CPU 10 transmits an instruction to the GPS reception processing section 15 to make the GPS reception processing section 15 start the reception processing of the electric waves from the GPS satellites (Step S322) and sets the GPS flag "ON" (Step S323).

Moreover, the CPU 10 sets the car flag "OFF" (Step S324) and sets the walk flag "ON" (Step S325).

Then, the CPU 10 returns the present processing to that at Step S12.

When it is judged that the present movement method is continuously being a movement state by car in the judgment processing at Step S301, the CPU 10 moves the present processing to that at Step S331.

Then, the CPU 10 judges whether the GPS reception processing section 15 is performing the reception processing of an electric wave from a GPS satellite or not.

When it is judged that the GPS reception processing section 15 is performing the reception processing of an electric wave from a GPS satellite, the CPU 10 makes the GPS reception processing section 15 continuously perform the reception processing (Step S332), and makes the GPS reception processing section 15 perform the position arithmetic processing by using the received and demodulated signal from the GPS satellite (Step S333).

The CPU 10 obtains the position arithmetic result output from the GPS reception processing section 15, and makes the position, azimuth, and time information storage section 11*a* store the position and the time (Step S334).

After that, the CPU 10 moves the present processing to that at Step S335.

On the other hand, when it is judged that the GPS reception processing section 15 is not performing any reception processing of any electric waves from any GPS satellites in the judgment processing at Step S331, the CPU 10 branches the present processing to the "NO" branch, and omits the processing at Steps S332-S334 to move the present processing to that at Step S335.

Next, the CPU 10 judges whether the GPS reception processing has ended or not.

When it is judged that no reception processing by the GPS reception processing section 15 is being performed and the GPS reception processing has already ended, the CPU 10 sets the GPS flag "OFF" (Step S336).

After that, the CPU 10 moves the present processing to that at Step S337.

When it is judged that the GPS reception processing has not ended yet, the CPU 10 omits the processing at Step S336 and moves the present processing to that at Step S337 with the GPS flag being "ON" as it is.

Subsequently, the CPU 10 judges whether the traveling azimuth of the car has changed or not (Step S337).

When it is judged that the traveling azimuth of the car has changed, the CPU 10 performs change and time storing processing (Step S338).

In this change and time storing processing, the CPU 10 obtains the data of a new traveling azimuth of the car from the traveling azimuth settlement processing section 22 and makes the position, azimuth, and time information storage section 11a store the obtained data together with the elapsed time from the movement start of the car.

After that, the CPU 10 executes the movement processing by car (Step S339).

In this movement processing by car, the CPU 10 first judges whether the average speed of the car has been calculated or not.

When the average speed has already been calculated, the CPU 10 calculates a migration path on the supposition that the car has moved from the movement start position stored in the position, azimuth, and time information storage section 11a at the average speed, and makes the display section 18 display the calculated migration path.

On the other hand, when the average speed has not been obtained, the CPU 10 next judges whether the position data at the second time after the start of the movement by car has been obtained or not in the position and time storing processing (Step S334).

Then, when the position data at the second time after the start of the movement by car has been obtained, the CPU 10 calculates the average speed from the pieces of position data at the first and the second times.

It is possible to adapt the average speed to include the correction angle of a traveling azimuth when the azimuth between the pieces of position data does not agree with the traveling azimuth by the traveling azimuth settlement processing section 22.

When the position data at the second time after the start of the movement by car has not been obtained, the CPU starts to obtain the position data at the second time when the elapsed time from the start of the movement has reached a predetermined time or more.

That is, the CPU 10 performs the GPS reception start processing and sets the GPS flag "ON".

When the movement processing by car (Step S339) has ended, the CPU 10 returns the present processing to that at Step S12.

Next, a concrete operation example in the case where the positioning processing is executed at the time of a movement by car will be described with reference to a flow chart.

Figure 6:
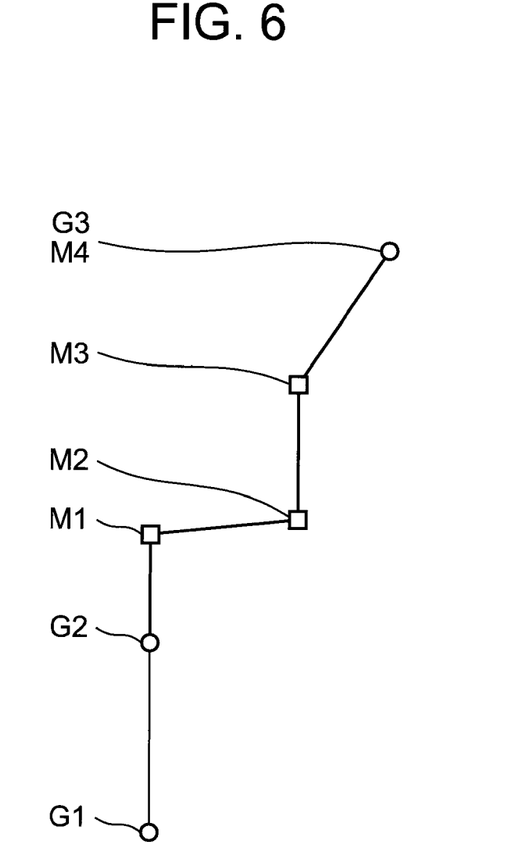
FIG. 6 is a diagram showing a concrete example of measurement of a migration path by car.

FIG. 6 is a view showing an example of the positioning processing in a movement state by car in the present embodiment.

When a user tries to get in a car at a place G1, the CPU 10 judges this operation as a walking state and sets the walk flag "ON" (Steps S11 and S14).

At this time, the CPU 10 sets the GPS positioning position obtained by using a GPS satellite as the initial position, and calculates the migration path to the car by the autonomous navigation.

Until the car starts to move after the user has gotten in the car, it is detected that the movement state of the user is a stopping state (Steps S12, S13, and S201), and the CPU 10 performs the stop processing (Step S211) to make the autonomous navigation control processing section 23 stop the processing thereof.

Moreover, the CPU 10 sets the walk flag "OFF" and sets the stop flag "ON".

When the CPU 10 has continuously detected the stopping state (Steps S12-S14 and S101), the CPU 10 repeats the stop processing (Step S117).

Next, when the user starts the drive of the car, the CPU 10 detects the movement state by car (Steps S12-S14 and S101).

First, the CPU 10 executes the movement processing by car (Step S131) and starts the operation of the traveling azimuth settlement processing section 22.

A traveling azimuth is generated by the movement of the car, and the CPU 10 makes the traveling azimuth settlement processing section 22 detect the traveling azimuth. The CPU 10 then makes the position, azimuth, and time information storage section 11a store the detected traveling azimuth together with the initial value "0" of the elapsed time of the movement of the car (Steps S132 and S133).

Subsequently, the CPU 10 sets the stop flag "OFF" (Step S134) and sets the car flag "ON" (Step S135).

When the movement by car is continued (Steps S12-S14 and S301) and the elapsed time from the movement start reaches the predetermined time or more at a place G2, the CPU 10 performs the GPS reception start processing at the second time by the movement processing by car (Step S339).

Moreover, the CPU 10 sets the GPS flag "ON".

Then, the CPU 10 performs the GPS reception processing and the position arithmetic processing (Steps S331-S333), and makes the position, azimuth, and time information storage section 11a store the obtained present position and the present time together with the elapsed time from the movement start (Step S334).

When the GPS reception processing has ended, the CPU 10 sets the GPS flag "OFF" (Steps S335 and S336).

Moreover, after the CPU 10 makes the position, azimuth, and time information storage section 11a store the GPS positioning position at the second time, the CPU 10 calculates the average speed between the initial position and the position at the second time in the movement processing by car (Step S339).

Then, the CPU 10 calculates a provisional migration path based on the initial position, the traveling azimuth from the initial position, the elapsed time from the initial position, and this average speed, and makes the display section 18 display the calculated provisional migration path.

After that, when the CPU 10 detects changes of the traveling azimuth of the car ("YES" at Step S337) at, for example, intersections, or places M1-M3, in the way of a further continuation of the movement state by car (Steps S12-S14 and S301), the CPU 10 makes the position, azimuth, and time information storage section 11a store the new traveling azimuths after the changes together with the elapsed times from the movement start (Step S338).

Moreover, the CPU 10 provisionally calculates movement distances to the new traveling azimuths based on the continuation times from the time points when the azimuth has been changed and the calculated average speed, and makes the display section 18 display the calculated movement distances (Step S339).

For example, when the car stops at a place G3 in conformity with a red signal, the operation state of the user changes from the movement state by car to a stopping state (Steps S12-S14 and S301).

Then, the CPU 10 performs the GPS reception start processing (Step S311) and sets the GPS flag "ON" (Step S312).

Moreover, the CPU 10 sets the car flag "OFF" (Step S313) and sets the stop flag "ON" (Step S314).

When the CPU 10 continuously detects the stopping state (Steps S12-S14 and S101), the CPU 10 performs the GPS reception processing and the position arithmetic processing during this stopping state (Steps S111-S113) and makes the position, azimuth, and time information storage section 11a store the obtained position data (Step S114).

Then, the CPU 10 ends the GPS reception processing and sets the GPS flag "OFF" (step S116).

Subsequently, the CPU executes the stop processing (Step S117).

The CPU 10 first makes the processing by the traveling azimuth settlement processing section 22 stop.

After that, the CPU 10 obtains the shifted angle and the distance ratio between a place M4, which has provisionally been obtained to the position data of the place G2, and the place G3, which has accurately been obtained.

Successively, the CPU 10 performs the correction of the position data of the places M1-M3 similarly on the supposition that the same shifted angle and the same distance ratio from the place G2 exist.

When the car again starts to run before the GPS reception processing ends (Steps S12-S14 and S101), the CPU 10 makes the processing by the traveling azimuth settlement processing section 22 restart, and sets the stop flag "OFF" and sets the car flag "ON".

Moreover, the CPU 10 performs the GPS reception processing while the car is continuously running (Steps S331-S336) and settles the position of the place G3 by using the obtained position data. The CPU 10 further performs correction processing of the position data of the places M1-M3 in the movement processing by car (Step S339).

If the user uses public transportation, such as a bus, and the public transportation starts at the same time that the user gets into the public transportation, the operation state of the user directly changes from a walking state to a movement state by car (Steps S12-S14 and S201).

Also in this case, the CPU 10 performs the movement processing by car (Step S231) similarly to the case where the user moves from a stopping state to a movement state by car except that the CPU 10 stops the autonomous navigation processing.

When the movement state by car is continuing (Steps S12-S14 and S301), the CPU 10 performs the same processing on and after that.

Similarly, when the user gets out of a car at the same time that the car stops, the operation state directly changes from the movement state by car to a walking state (Steps S12-S14 and S301).

Also in this case, the CPU 10 first performs the walk processing (Step S321) and performs the processing similar to that in the case where the user changes a movement state by car to a stopping state except that the CPU 10 changes the processing by the traveling azimuth settlement processing section 22 to the processing by the autonomous navigation control processing section 23 (Steps S322-S325).

Then, the CPU 10 performs the GPS reception processing and the position arithmetic processing (Steps S221-S223, S225, and S226) during the continuation of the walking state (Steps S12-S14 and S201).

Then, the CPU 10 performs the correction processing of the pieces of position data of the places M1-M3 in the walk processing (Step S227) based on the position data of the place G3 obtained and stored in the position, azimuth, and time information storage section 11a (Step S224).

As described above, the positioning apparatus 1 of the embodiment described above can obtain only the data of a route azimuth by the traveling azimuth settlement processing section 22 without performing any autonomous navigation processing at the time of a movement sate by car by judging the movement sate by car from the waveform pattern of the three-axis acceleration sensor 17.

Moreover, the positioning apparatus 1 can calculate the average movement speed of a car by performing measurement processing of the position two times by using the GPS reception processing section 15 with a predetermined interval from the starting of a movement by car.

Then, the positioning apparatus 1 can increase the obtainment accuracy of the position data at the time of a movement by car without increasing the number of times of positioning using the GPS by calculating a movement distance by using the average movement speed in a movement time to the obtained traveling azimuth.

Moreover, the positioning apparatus 1 can effectively improve the accuracy by using the movement speed obtained by GPS positioning especially when the movement speed is large like a movement by car and the calculation accuracy of the movement speed by the autonomous navigation is low.

Moreover, the positioning apparatus 1 can make the position, azimuth, and time information storage section 11a store the accurate traveling azimuth data obtained with the three-axis azimuth sensor and the data of the movement continuation time in each traveling azimuth even if there was a turn of the traveling azimuth of the car in the way of the movement. Consequently, the positioning apparatus 1 can perform the accurate correction processing of the data of the migration path in the way between the start point and the end point of a movement to obtain the data only by positioning processing using the GPS two times at the start point and the end point of the movement by regarding the movement as a constant speed movement.

Moreover, especially by obtaining the average movement speed at the time of starting a movement by car, the positioning apparatus 1 can thereby obtain the present positions and the migration paths in real time by using the average movement speed without relying upon GPS positioning of a high frequency after that while the movement by car is continuing.

Moreover, because the positioning apparatus 1 can correct the position data and the migration paths described above to obtain them by performing the positioning processing using the GPS satellites again after stopping the movement by car, the positioning apparatus 1 can obtain the locus data having further higher accuracy than that of the migration path obtained in real time.

Moreover, because the positioning apparatus 1 performs the improvement of the calculated data of the movement positions described above by performing the correction processing thereof at any time with the positioning processing using the GPS satellites being inserted between the pieces of correction processing as the occasion demands, the lowering of the accuracy owing to the increase of the shifts between the measurement of the displacement quantity using the average speed and actual displacement quantities can be prevented.

Moreover, because the positioning apparatus 1 updates the calculation of the migration path every stop of a movement by car at an intersection and a red signal, the positioning apparatus 1 can obtain the data of the start point and the end point of each movement at a high accuracy, and consequently the positioning apparatus 1 can also improve the accuracy of the data in the way of the movement.

Furthermore, because the positioning apparatus 1 is equipped with the display section 18 and can make the display section 8 display a migration path, a user can easily recognize the data of a migration path having high accuracy by means of one positioning apparatus 1 in real time.

Incidentally, the present invention is not limited to the embodiment described above, and various changes can be performed.

For example, although the present invention is used for the path determination at the time of using a car in the aforesaid description, the present invention can be used for other movement means, such as a bicycle, a motorbike, and a streetcar.

Moreover, although the aforesaid embodiment of the present invention performs the measurement of a position using GPS satellites, the present invention may use other satellite positioning systems, such as the GLONASS (Global Navigation Satellite System).

Moreover, the present invention can use position measurement using communication between a cellular phone handset and a base station of the cellular phone.

Moreover, although the present invention performs the calculation on the supposition that a movement by car is performed at a constant speed in the embodiment described above, it is also possible to perform the calculation by lowering the speed at the time when the intervals of the changes of the traveling azimuth are narrow.

Moreover, the present invention can refer to the map data stored in the nonvolatile memory 13 to change the speed of a car at the time of the use of a superhighway or the like.

Moreover, the present invention can refer to the map data stored in the nonvolatile memory 13 to limit the measured positions. The present invention thereby can also obtain the data of a migration path at high accuracy.

Moreover, although the present invention performs positioning using GPS satellites at the time of the stopping of a movement by car in the embodiment described above, the timing of performing the positioning is not limited to this one.

The present invention also can perform the positioning using the GPS satellites at, for example, constant time intervals.

Alternatively, the present invention may compare movement speeds obtained by autonomous navigation as relative values and may perform the positioning using the GPS satellites when the movement speeds are greatly different from an obtained relative speed to re-calculate an average speed.

Moreover, although the present invention has shown in the embodiment described above as the mode in which the CPU 10 makes the GPS reception processing section 15, the state judgment processing section 21, and the traveling azimuth settlement processing section 22 execute each processing based on the program 12a stored in the ROM 12, the present invention may be configured to perform all of the pieces of processing by operations of the CPU 10 as software processing.

In addition, the details of the numeral values and the configurations shown in the description of the embodiment can suitably be changed without departing from the sprit and the scope of the present invention.

The entire disclosure of Japanese Patent Application No. 2010-196306 filed on Sep. 2, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

The invention claimed is:

1. A positioning apparatus, comprising:
a first measuring section to obtain position information by directly measuring its own present position;
a second measuring section to measure an azimuth and a movement of a user;
a movement method judging section to judge a movement method of the user based on the movement of the user measured by the second measuring section;
an azimuth specifying section to specify a movement azimuth of the user based on the azimuth and the movement of the user measured by the second measuring section;
a movement speed calculating section to calculate an average movement speed in a period in which the movement method judging section judges the movement method of the user to be a movement state by car;
a position calculating section to obtain a movement position by integrating a movement distance into the movement azimuth specified by the azimuth specifying section at the average movement speed to reference position information obtained by the first measuring section when the movement method judging section judges the movement method of the user to be the movement state by car;
a movement azimuth storage section to sequentially store the movement azimuth and a time indicating a movement time into the movement azimuth; and
a movement data storage controlling section to make the movement azimuth storage section sequentially store the movement time into the movement azimuth before a change and the movement azimuth after the change when the change of the movement azimuth is detected by the azimuth specifying section;
wherein the movement speed calculating section obtains a conversion matrix to perform a rotation, expansion, and contraction operations in order to make a sum of each of movement vectors having the movement azimuth and a length corresponding to the movement time into the movement azimuth, which is stored in the movement azimuth storage section from a measurement time of a first place whose position information is obtained by the first measuring section to a measurement time of a second place whose position information is obtained by the first measuring section, agree with a vector having a direction and a distance from the first place to the second place, which are obtained by the first measuring section, and the movement speed calculating section calculates the average movement speed and an angle error based on the conversion matrix; and
wherein the position calculating section obtains the movement position by integrating the movement vectors to the reference position information obtained by the first measuring section, the movement vectors corrected based on the movement azimuth specified by the azimuth specifying section, the movement time into the movement azimuth, the average movement speed, and the angle error.

2. The positioning apparatus according to claim 1, wherein the length of each of the movement vectors is proportioned to the movement time.

3. The positioning apparatus according to claim 1, further comprising:
a positioning controlling section to make the first measuring section operate to obtain the position information of the first place, at which a movement by car has started, when it is judged that the movement method judging section has judged that the movement by car has started, and to make the first measuring section operate to obtain the position information of the second place after a predetermined period from a time when the position information of the first place has been obtained.

4. The positioning apparatus according to claim 1, further comprising:
a migration path determining section to determine a migration path from the first place to the second place by performing the rotation, expansion, and contraction operations of each of the movement vectors by means of the conversion matrix, and by adding the operated movement vectors to the position information of the first place in order.

5. The positioning apparatus according to claim 4, wherein:
the position calculating section sets the second place as a new first place; the position calculating section subsequently obtains the movement position based on the new first place as the reference position information until position information of a new second place is obtained; and
when the position information of the new second place is obtained, the movement speed calculating section obtains a new conversion matrix, and the migration path determining section determines a migration path from the new first place to the new second place by using the new conversion matrix.

6. The positioning apparatus according to claim 4, wherein:
when the movement method judging section judges that the movement by car has stopped, the positioning controlling section sets a position where the movement has stopped as the second place; and
the positioning apparatus makes the first measuring section operate to obtain the position information.

7. The positioning apparatus according to claim 1, further comprising:
a display section to display a migration path and the movement position; and
a display controlling section to control display content and display timing of the display section,
wherein the display controlling section makes the display section display the migration path and the movement position, both being calculated, at any time after the position information of the second place has once been obtained.

8. A positioning method performed by a computer operable with a positioning apparatus including a first measuring section to obtain position information by directly measuring its own present position and a second measuring section to measure an azimuth and a movement of a user, the method comprising:
judging a movement method of the user based on the movement of the user measured by the second measuring section;
specifying a movement azimuth of the user based on the azimuth and the movement of the user, both measured by the second measuring section;
calculating, by way of the computer, an average movement speed in a period in which the movement method of the user is judged to be a movement state by car;
obtaining a movement position by integrating a movement distance to reference position information obtained by first measuring section, the movement distance being a distance of a movement into the movement azimuth specified at the average movement speed when the movement method of the user is judged to be the movement state by car;
sequentially storing the movement azimuth and a time indicating a movement time into the movement azimuth; and sequentially storing the movement time into the movement azimuth before a change and the movement azimuth after the change when the change of the movement azimuth is detected;
wherein the calculating of the average movement speed comprises obtaining a conversion matrix to perform a rotation, expansion, and contraction operations in order to make a sum of each of movement vectors having the movement azimuth and a length corresponding to the movement time into the movement azimuth, which is stored from a measurement time of a first place whose position information is obtained by the first measuring section to a measurement time of a second place whose position information is obtained by the first measuring section, agree with a vector having a direction and a distance from the first place to the second place, which are obtained by the first measuring section, and then calculating the average movement speed and an angle error based on the conversion matrix; and
wherein the movement position is obtained by integrating the movement vectors to the reference position information obtained by the first measuring section, the movement vectors corrected based on the specified movement azimuth, the movement time into the movement azimuth, the average movement speed, and the angle error.

9. A non-transitory storage medium having recorded thereon a program for a computer operable with a positioning apparatus including a first measuring section to obtain position information by directly measuring its own present position and a second measuring section to measure an azimuth and a movement of a user, the program controlling the computer function as:
a movement method judging section to judge a movement method of the user based on the movement of the user measured by the second measuring section;
an azimuth specifying section to specify a movement azimuth of the user based on the azimuth and the movement of the user measured by the second measuring section;
a movement speed calculating section to calculate an average movement speed in a period in which the movement method judging section judges the movement method of the user to be a movement state by car;
a position calculating section to obtain a movement position by integrating a movement distance into the movement azimuth specified by the azimuth specifying section at the average movement speed to reference position information obtained by the first measuring section when the movement method judging section judges the movement method of the user to be the movement state by car;
a movement azimuth storage section to sequentially store the movement azimuth and a time indicating a movement time into the movement azimuth; and
a movement data storage controlling section to make the movement azimuth storage section sequentially store the movement time into the movement azimuth before a change and the movement azimuth after the change when the change of the movement azimuth is detected by the azimuth specifying section;
wherein the movement speed calculating section obtains a conversion matrix to perform a rotation, expansion, and contraction operations in order to make a sum of each of movement vectors having the movement azimuth and a length corresponding to the movement time into the movement azimuth, which is stored in the movement azimuth storage section from a measurement time of a first place whose position information is obtained by the first measuring section to a measurement time of a second place whose position information is obtained by the first measuring section, agree with a vector having a direction and a distance from the first place to the second place, which are obtained by the first measuring section, and the movement speed calculating section calculates the average movement speed and an angle error based on the conversion matrix; and wherein the position calculating section obtains the movement position by integrating the movement vectors to the reference position information obtained by the first measuring section, the movement vectors corrected based on the movement azimuth specified by the azimuth specifying section, the movement time into the movement azimuth, the average movement speed, and the angle error.

* * * * *